D. TAKAHASHI.
BAKING MACHINE.
APPLICATION FILED NOV. 4, 1918.

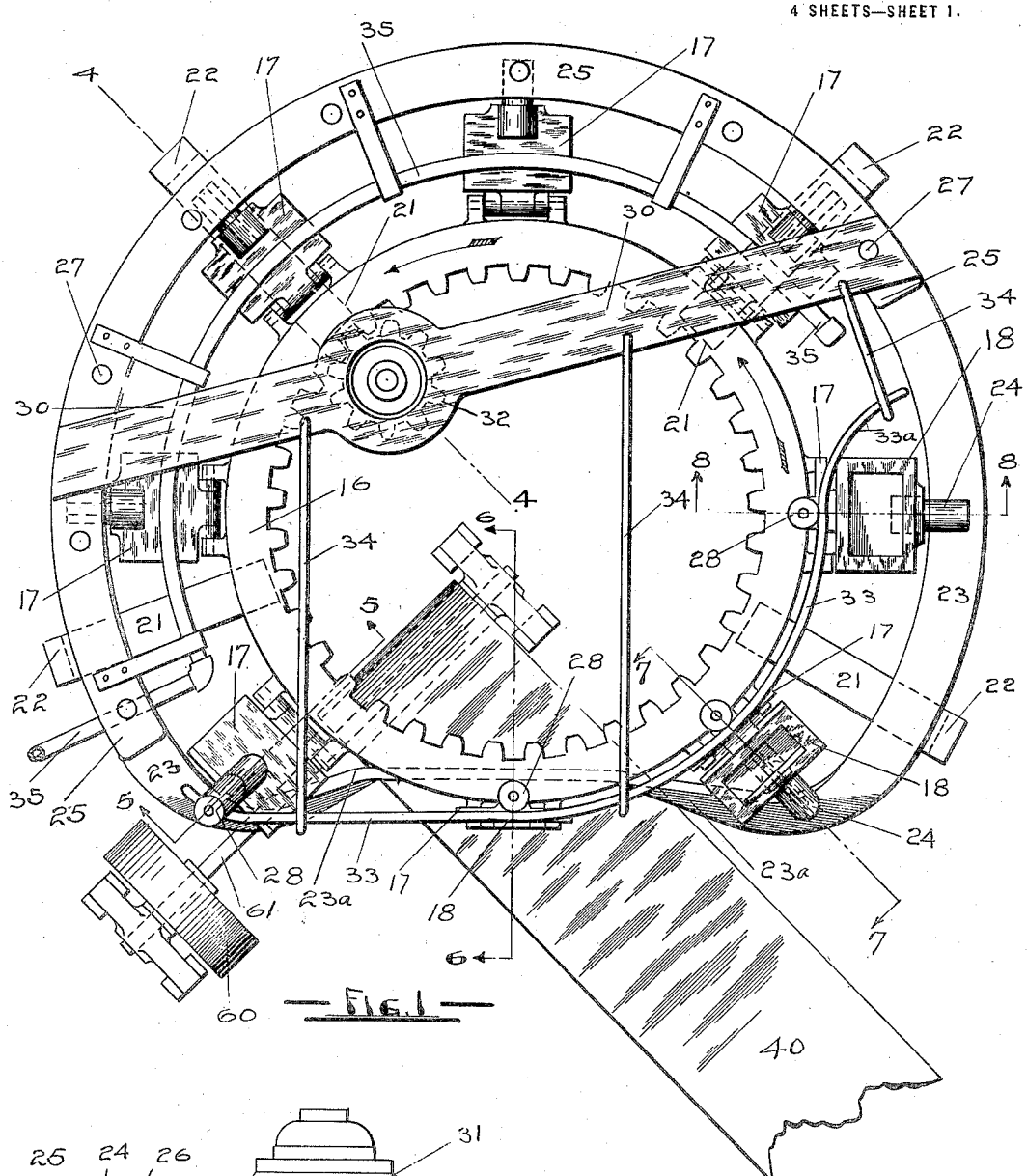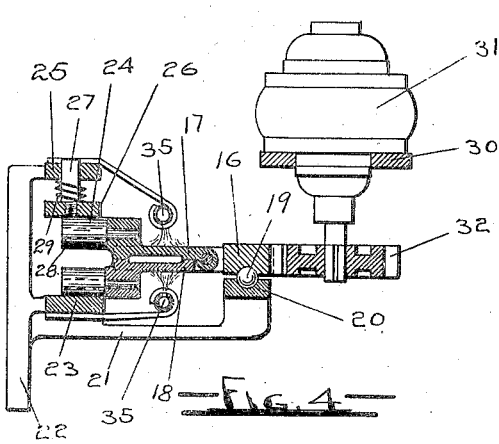

1,303,128.

Patented May 6, 1919.

INVENTOR
DANNOJO TAKAHASHI

BY
C. F. Blake
ATTORNEY

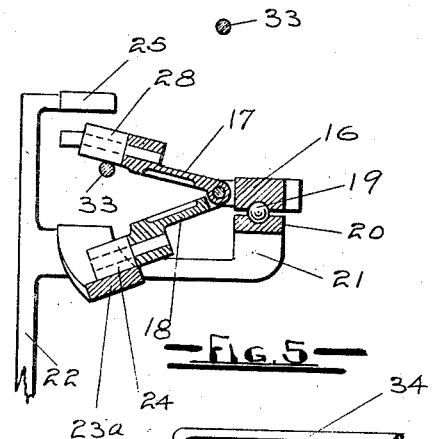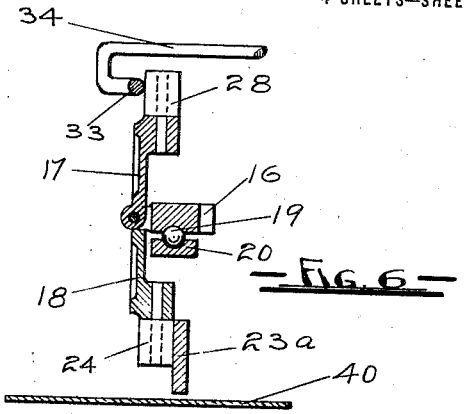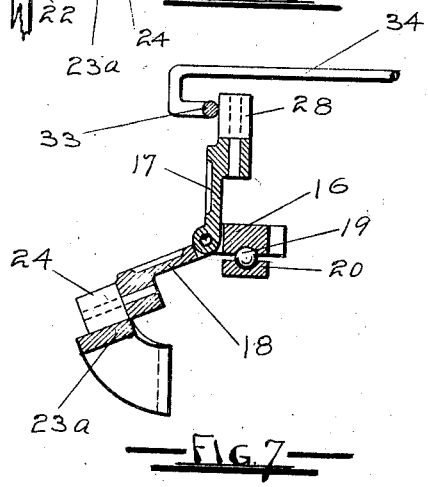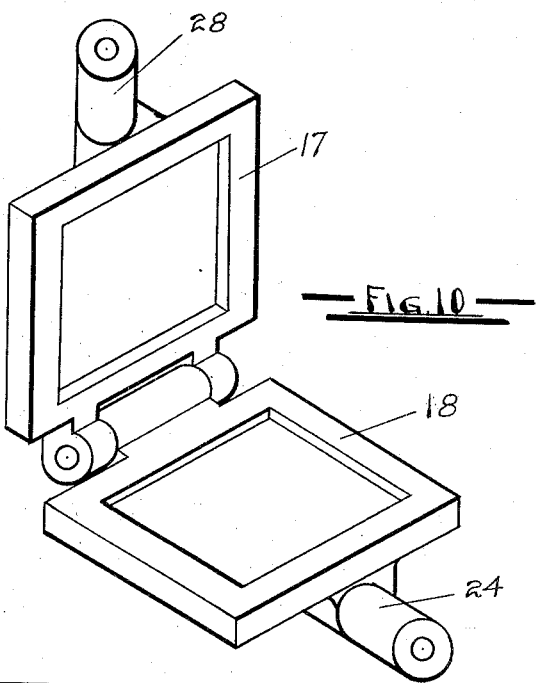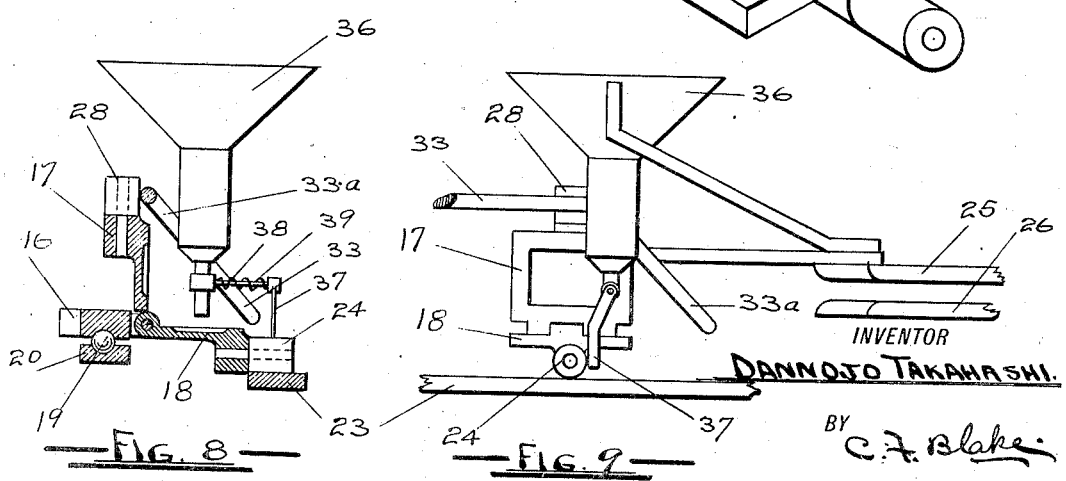

D. TAKAHASHI.
BAKING MACHINE.
APPLICATION FILED NOV. 4, 1918.
1,303,128.
Patented May 6, 1919.
4 SHEETS—SHEET 4.
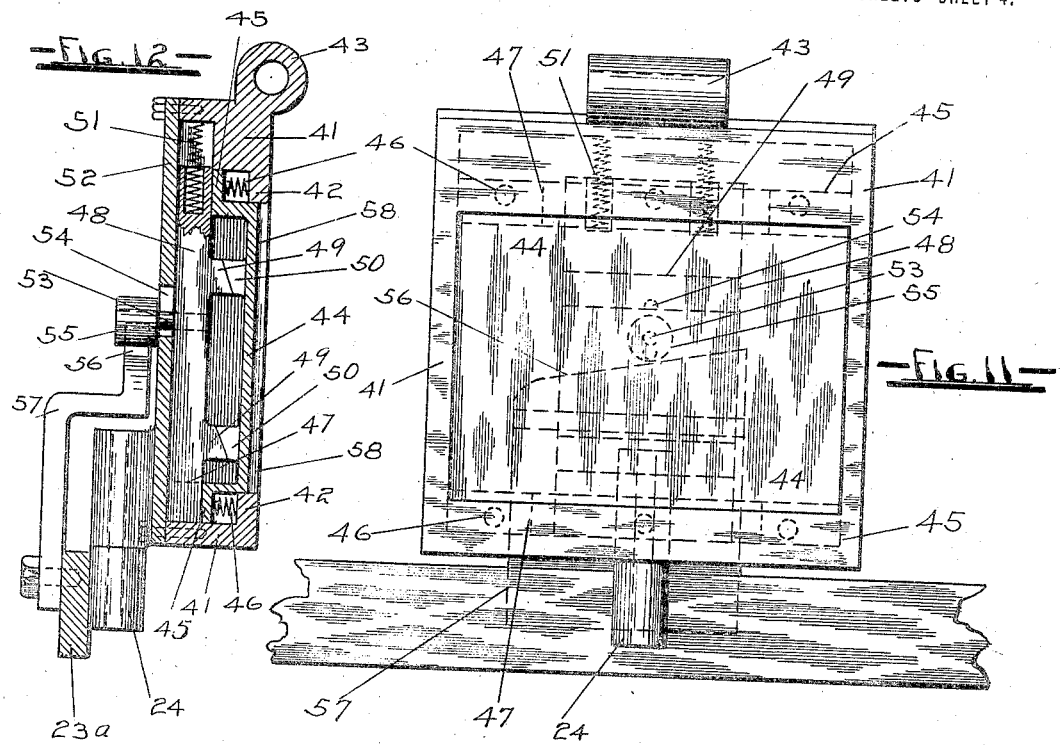
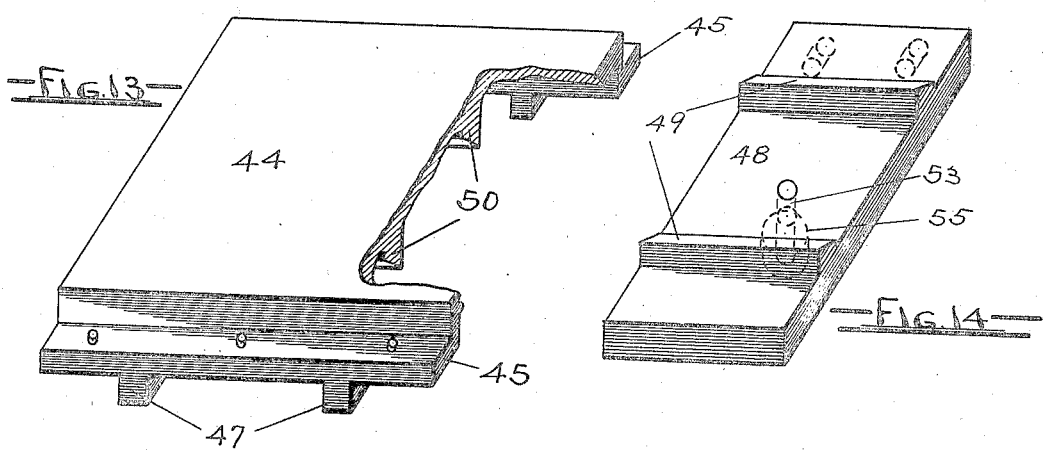
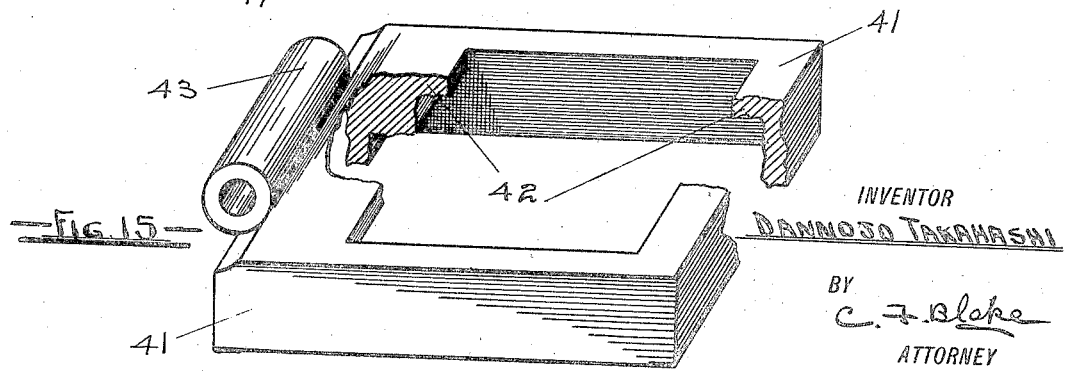
INVENTOR
DANNOJO TAKAHASHI
BY
C. F. Blake
ATTORNEY

UNITED STATES PATENT OFFICE.

DANNOJO TAKAHASHI, OF PORTLAND, OREGON.

BAKING-MACHINE.

1,303,128.   Specification of Letters Patent.   Patented May 6, 1919.

Application filed November 4, 1918.   Serial No. 261,168.

*To all whom it may concern:*

Be it known that I, DANNOJO TAKAHASHI, a subject of the Emperor of Japan, and a resident of Portland, county of Multnomah, State of Oregon, have invented certain new and useful Improvements in Baking-Machines, of which the following is a specification.

My invention relates to baking machines in general, and particularly to such machines as are used for the baking of cookies and the like.

The object of my invention is to provide such a machine of great simplicity and few parts, that will receive the dough and bake and deliver the cookies uninterruptedly, which I accomplish by means of the construction illustrated in the accompanying drawings, like characters of reference indicating like parts throughout the several views thereof, and in which:

Figure 1 is a plan view of my device with the motor and dough receptacle removed therefrom.

Figure 2:
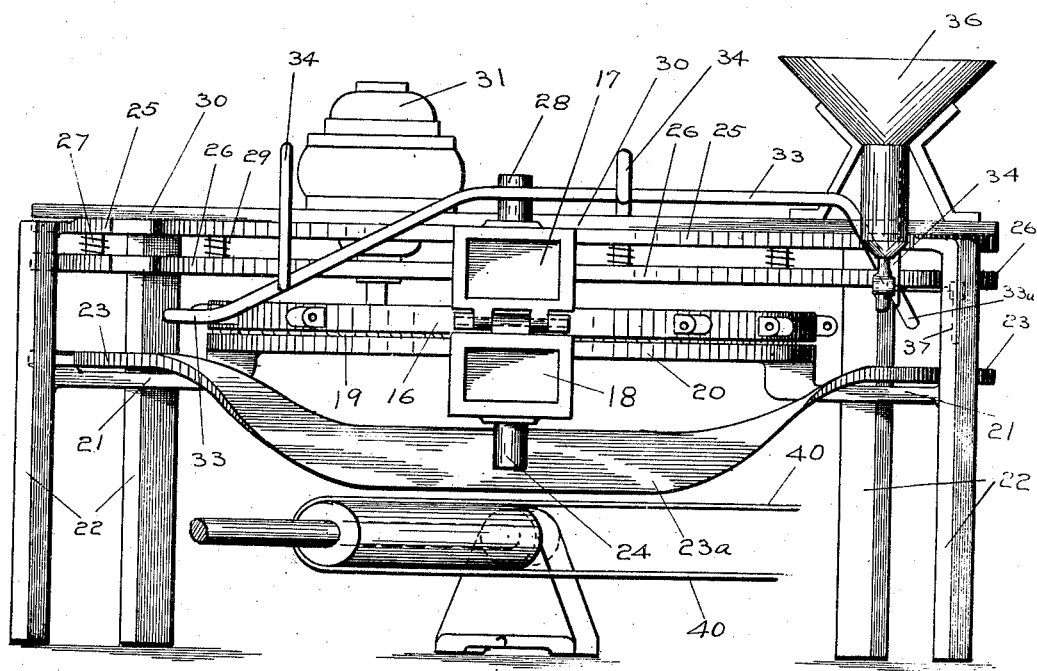
Fig. 2 is a front elevation of my device, only one of the baking forms being shown thereon.
Figure 3:
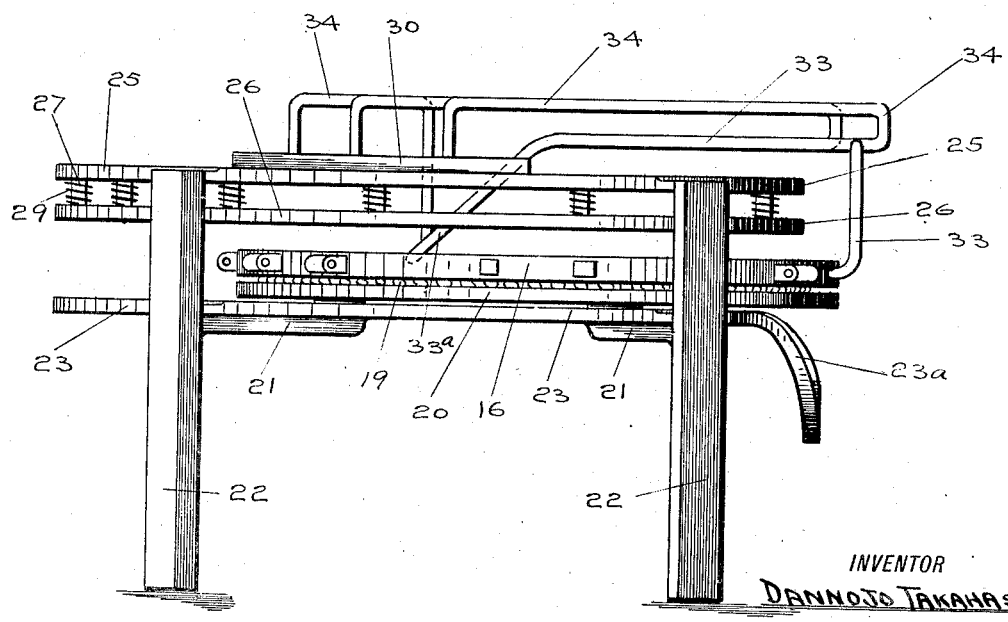
Fig. 3 is a side elevation of the frame of my device.

Fig. 4 is a section upon line 4—4 of Fig. 1.
Fig. 5 is a section upon line 5—5 of Fig. 1.
Fig. 6 is a section upon line 6—6 of Fig. 1.
Fig. 7 is a section upon line 7—7 of Fig. 1.
Fig. 8 is a section upon line 8—8 of Fig. 1.

Fig. 9 is a side elevation of the subject matter of Fig. 8.

Fig. 10 is a perspective view of one of the baking forms.

Fig. 11 is a plan view of one member of a modification of the baking forms.

Fig. 12 is a sectional elevation of the subject matter of Fig. 11.

Fig. 13 is a perspective detail of the form bottom as used in the construction illustrated in Fig. 11.

Fig. 14 is a perspective detail of the wedge member as used in the construction illustrated in Fig. 11.

Fig. 15 is a perspective detail of the frame used in the construction illustrated in Fig. 11.

In general my invention consists of a rotatable annular internally toothed ring 16 to the external periphery of which are pivotally attached the upper and lower members 17 and 18 respectively of the baking forms; and cam shaped track members controlling the operation of said baking form members.

The ring 16 rotates upon balls 19 supported in a ball race in a ring member 20 which is supported by brackets 21 from legs 22.

An annular track member 23 is mounted upon brackets 21 concentrically with the ring members 20, and each lower member 18 of the baking forms is provided with a roller 24 adapted to bear and roll upon the upper surface of said track member 23.

For the purpose of allowing said lower member 18 of each baking form to drop about its pivotal connection to the ring 16 so as to open said baking form, a portion of the track 23 is bent downwardly as at 23$^a$ until the face thereof becomes substantially vertical.

A portion, consisting of substantially one-half of the whole, of an annular ring 25 is mounted upon certain of legs 22 concentrically with and above the track rings 23, leaving the bent portion 23$^a$ thereof and also a portion of the horizontal part 23 thereof uncovered by the member 25, as shown in Fig. 1.

Immediately beneath member 25 is a similar member 26 attached to the member 25 in a vertically slidable manner by dowels 27.

Rollers 28 upon the upper portion 17 of the baking forms contact with members 26 as they pass thereunder, and springs 29 upon dowels 27 pressing downward upon members 26 force the adjacent rollers 24 and 28 respective to each of the baking forms toward each other, resulting in forcibly closing the baking forms, as shown in Fig. 4, although in a yieldable manner that enables a slight opening of each form for the escape of any steam that may form therein.

A motor supporting member 30 is mounted upon member 25, and thereon is mounted a motor 31 having a pinion 32 meshing with toothed ring 16 to drive the latter.

To raise the upper portion 17 of each baking form simultaneously with the dropping of the lower portion thereof as the roller 24 passes portion 23$^a$ of track ring 23, I provide a bar 33 adapted to receive the rollers 28 thereon as they successively pass from beneath member 26, and to guide the same into an upright or vertical position, as shown in Figs. 2, 5, 7 and 8.

Said rod 33 is mounted upon supporting rods 34 secured to motor support 30, and the end thereof from which the rollers 28 recede is bent downwardly as at 33ª to allow the upper portion 17 of the baking forms to close upon the respective lower portion 18 thereof previously to entering beneath the member 26.

Perforated gas pipes 35 are provided, as shown in Figs. 1 and 4, to heat the baking forms and bake the cookies while said forms are passing beneath the member 28.

A dough receptacle 36 is provided located immediately above the lower portion 18 of the baking forms when in position upon line 8—8 of Fig. 1, as shown in Figs. 2, 8 and 9, and a depending lever 37 from the valve stem 38 of said receptacle is provided to contact with the rollers 24 as they pass beneath said receptacle, thereby opening the valve thereof and allowing dough to be deposited into the lower portion 18 of the baking form immediately beneath. As said roller passes onward a spring 39 upon valve stem 38 closes the receptacle valve and thereby shuts off the depositing of further dough until the passage of another roller 24.

A belt conveyer 40 is provided immediately below the baking form when in position indicated by line 6—6 of Fig. 1, to receive the baked cookies which fall from the opened baking form above. Ordinarily said baked cookies fall by gravity from the lower portion 18 of the baking forms when opened above said conveyer, but to provide a positive ejection means for the baked cookies I provide the type of lower baking form member illustrated in Figs. 12 to 15 inclusive, as a modification.

This modified type of baking form member consists of a rectangular frame 41 with inwardly turned lips or flanges 42 upon oppositely disposed inner faces thereof, and a hinged member 43 thereon.

A bottom member 44 is disposed within the frame 43 and below the face thereof a distance equal to the thickness of the cooky to be baked, and upon opposite sides of said member 44 are provided flanges 45, and a number of springs 46 are inserted between flanges 45 of member 44 and flanges 42 of frame 41, as shown in Fig. 12.

Lugs 47 depending from flanges 45 form therebetween guides for a reciprocating member 48. Said reciprocating member 48 has upon the face thereof adjacent member 44 wedges 49 which contact with similar wedges 50 upon the under face of member 44.

Springs 51 are inserted between one end of reciprocating member 48 and frame 41 for the purpose of returning said member 48 to its initial position after operation thereof.

A cover 52 is provided for the back of frame 41 whereby the reciprocating member 48 and the member 44 are made prisoners within said frame 41, and a pin 53 attached to reciprocating member 48 passes through a slot 54 in said cover and carries thereon a roller 55. Said roller 55 contacts with the inclined surface 56 of a cam 57 which is secured to the downwardly bent portion 23ª of track member 23 in such a position as to come operatively into contact with roller 55 when the baking form is immediately over the conveyer 40.

By this means the reciprocating member 48 is moved toward the hinge end of the frame 41, thereby, through the wedges 49 and 50 forcing the member 44 outward until the surface thereof is flush with the surface of frame 41, when the baked cooky, until then reposing within the depression 58 bounded by the frame 41 and the member 44, falls upon the conveyer belt 40, and as the baking form passes along the roller 55 leaves the cam 56 and the springs 51 and 46 cause the members 48 and 44 respectively to return to their initial positions.

In operating my device, the ring 16 and its attached baking forms are rotated by the motor 31. The lower portion 18 of each baking form is filled with dough from the receptacle 36 when said baking form is in the position indicated by line 8—8 in Fig. 1, and also in Figs. 8 and 9.

As the baking forms pass onward in the direction of the arrows shown upon the ring 16 in Fig. 1, the upper portion 17 thereof is caused to lower upon the lower portion 18 thereof by the downwardly curved end 33ª of rod 33. The baking form then passes onward with its rollers 24 and 28 pressed together between track 23 and member 26, meanwhile being exposed to the heat from the gas flames issuing from the gas pipes 35, which bakes the dough contained within the baking forms.

Upon emerging from beneath member 26 the upper member 17 of the baking form is raised by the rod 33 and the lower member 18 is allowed to drop by the curved portion of the track member 23 into the position 23ª. In this position of the baking form, shown at line 6—6 in Fig. 1, and also in Figs. 2 and 6, the baked cooky falls by gravity upon the conveyer belt 40, or is ejected by the mechanism described in connection with Figs. 12 to 15 inclusive.

Further movement of the baking form raises the lower member 18 thereof into a horizontal position and carries it beneath the dough receptacle to receive another charge of dough.

Each baking form progresses through this cycle of operations in turn, and the operation is continuous as long as the motor is kept running.

The conveyer 40 is illustrated as operated from some outside source of power not shown in the drawings, by means of a belt pulley upon the conveyer shaft 61.

My invention may be made of any size and constructed of any materials deemed convenient and suitable, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claims.

Having disclosed my invention so that others may be enabled to construct and to use the same, what I claim as new and wish to secure by Letters Patent is:

1. In a baking machine, a baking form composed of two members hinged together, and rollers upon each of said members; an annular track for one of said rollers to operate upon; a vertically yieldable member above a portion of said track for the other of said rollers to operate upon; a depressed portion in said track to allow one of said baking form members to lower; a guide to coöperate with the roller upon the other of said baking form members to raise the same simultaneously with the said lowering of the opposite member; means to move the baking forms continuously along said track; and means to heat said baking forms while the said rollers are passing between said track and said yieldable member.

2. In a baking machine, a rotatable ring; an annular track concentric with said ring and having a depressed portion therein; a vertically yieldable member above a portion of that part of said track not depressed; a plurality of pairs of upper and lower baking form members pivotally mounted upon said ring and extending radially therefrom; rollers upon each of said upper and lower baking form members adapted to contact respectively with said yieldable member and with said track; a guide adapted to coact with said rollers upon said upper baking form members to raise the same; means to heat said baking form members during a portion of each rotation thereof; means to deposit dough within the lower of said baking form members; and means to rotate said rotatable ring.

3. In a baking machine, a plurality of pairs of upper and lower baking form members each pair hinged together and pivotally connected to a rotatable member; means to forcibly but yieldably close said members during a portion of their rotation; means to heat said members while so closed; means to simultaneously raise the upper of said members and lower the lower of said members, thereby opening said baking forms; means to raise the lower of said members while maintaining the upper of said members in its raised position; means to deposit dough within the lower of said members while the upper of said members is raised; and means to rotate said rotatable member.

4. In a baking machine, baking forms composed of an upper member; a rectangular frame hinged to said upper member; a plate within said frame and movable therein normally to the surface thereof; a reciprocating member within said frame; coacting wedges upon said reciprocating member and upon said plate; means to return said reciprocating member to its initial position after operation; means to return said plate to its initial position after operation; and means to operate said reciprocating member.

In witness whereof I claim the foregoing as my own I hereunto affix my signature in the presence of witness at Portland, county of Multnomah, State of Oregon, this 11th day of Oct., 1918.

DANNOJO TAKAHASHI.

Witness:
C. F. BLAKE.